US009784453B2

(12) United States Patent
Hall

(10) Patent No.: US 9,784,453 B2
(45) Date of Patent: *Oct. 10, 2017

(54) LEVELING DEVICE FOR PORTABLE STOVE

(71) Applicant: John Ernest Hall, Napa, CA (US)

(72) Inventor: John Ernest Hall, Napa, CA (US)

(73) Assignee: John Ernest Hall, Napa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/253,807

(22) Filed: Apr. 15, 2014

(65) Prior Publication Data
US 2014/0326230 A1 Nov. 6, 2014

Related U.S. Application Data

(63) Continuation-in-part of application No. 13/374,989, filed on Jan. 27, 2012, now Pat. No. 8,695,931.

(51) Int. Cl.
F24C 1/16 (2006.01)
F16M 11/38 (2006.01)
F24C 3/14 (2006.01)
A47J 37/07 (2006.01)
F24C 15/08 (2006.01)
F16M 7/00 (2006.01)

(52) U.S. Cl.
CPC .............. F24C 1/16 (2013.01); A47J 37/0786 (2013.01); F16M 7/00 (2013.01); F16M 11/38 (2013.01); F24C 3/14 (2013.01); F24C 15/086 (2013.01); F16M 2200/08 (2013.01)

(58) Field of Classification Search
CPC . A47J 37/0786; A47J 2037/0795; F24C 3/14; F24C 15/086; F16M 7/00; F16M 11/38; F16C 1/16
USPC ....... 248/188.2, 188.4, 188.6, 188.7, 346.05, 248/172, 533, 528, 439; 99/449; 280/35; 126/30, 1 R, 24, 25 R, 29, 25 A A
See application file for complete search history.

(56) References Cited

U.S. PATENT DOCUMENTS

| 123,756 | A | | 2/1872 | Woodruff |
| 208,650 | A | | 10/1878 | Tucker |
| 217,172 | A | | 7/1879 | Tucker |
| 226,997 | A | | 4/1880 | Green et al. |
| RE9,283 | E | * | 7/1880 | Woodruff ........................ 280/35 |
| 234,336 | A | | 11/1880 | Schenck |
| 241,809 | A | * | 5/1881 | Long ..................... B62B 5/0083 |
| | | | | 280/35 |
| 378,135 | A | | 2/1888 | Hess |
| 442,825 | A | | 12/1890 | Randall |
| 525,298 | A | | 8/1894 | Thiele et al. |
| 1,151,291 | A | | 8/1915 | Sampson |
| 1,350,963 | A | | 8/1920 | Fowler |
| 1,853,318 | A | | 4/1932 | Peters |
| 1,890,729 | A | | 12/1932 | Ganson |

(Continued)

Primary Examiner — Stanton L Krycinski
Assistant Examiner — Guang H Guan
(74) Attorney, Agent, or Firm — Berenato & White, LLC

(57) ABSTRACT

A leveling kit for a portable stove is provided. The leveling kit can include a plurality of leveling devices. Each leveling device can include a mounting plate having a plurality of openings. Each leveling device can further include a fastener that extends through the mounting plate to couple the leveling device with the portable stove and a leveling member having a foot. The leveling member can be configured to have an adjustable height.

8 Claims, 15 Drawing Sheets

(56) References Cited

U.S. PATENT DOCUMENTS

| | | | |
|---|---|---|---|
| 2,158,546 A * | 5/1939 | Lang | A61G 21/00 16/19 |
| 2,534,367 A | 12/1950 | Perrotta et al. | |
| 2,654,421 A | 10/1953 | Neff | |
| 2,730,373 A * | 1/1956 | Blevins et al. | B62B 5/0083 280/35 |
| 2,739,776 A | 3/1956 | Terando | |
| 2,763,491 A | 9/1956 | Thorwaldson et al. | |
| 3,288,479 A | 11/1966 | Ullman | |
| 3,856,248 A * | 12/1974 | Labelle | B60P 3/36 248/188.2 |
| 4,166,638 A | 9/1979 | De Prado | |
| 4,743,039 A | 5/1988 | Ellis | |
| 4,955,873 A | 9/1990 | Rajlevsky | |
| 6,095,533 A * | 8/2000 | Balolia | B60T 1/14 188/19 |
| 6,719,250 B2 | 4/2004 | Fitzsimmons | |
| 6,964,423 B1 | 11/2005 | Chieh et al. | |
| 7,163,214 B1 * | 1/2007 | Bratton, Sr. | A63D 15/00 280/79.11 |
| 7,287,732 B2 | 10/2007 | Balistreri | |
| 7,681,847 B2 * | 3/2010 | Levin | A47B 9/18 248/188.2 |
| 8,695,931 B2 * | 4/2014 | Hall | A47J 37/0786 248/188.2 |
| 2009/0236479 A1 * | 9/2009 | Rose | A47G 7/025 248/188.7 |

\* cited by examiner

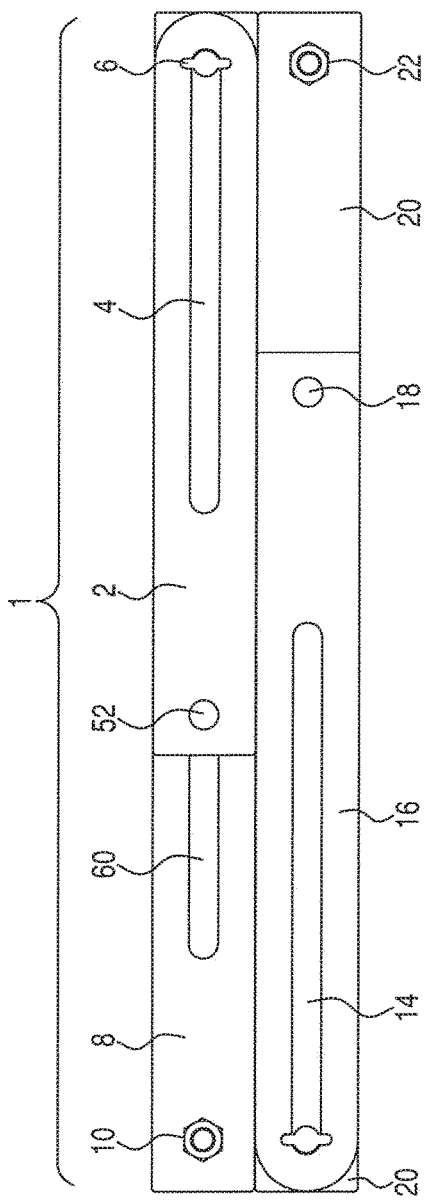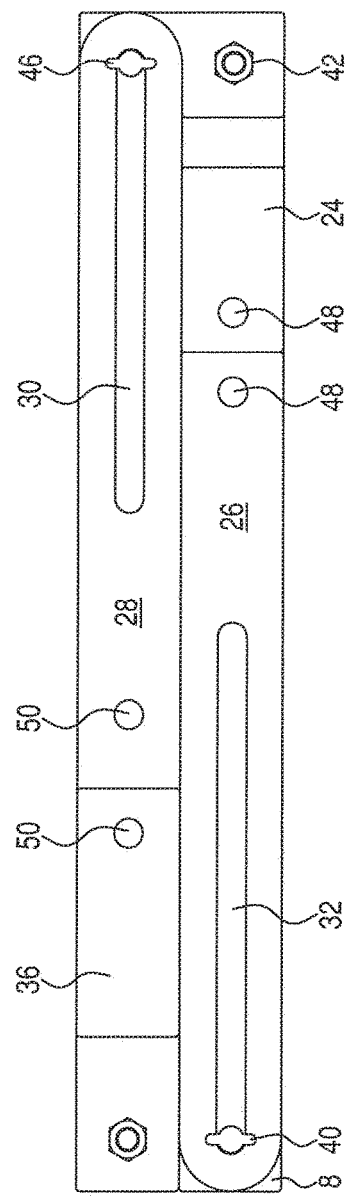

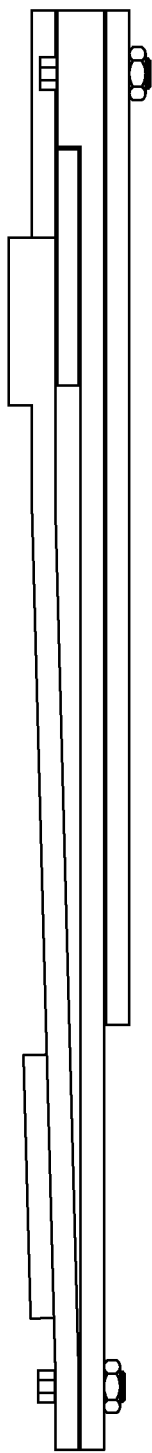

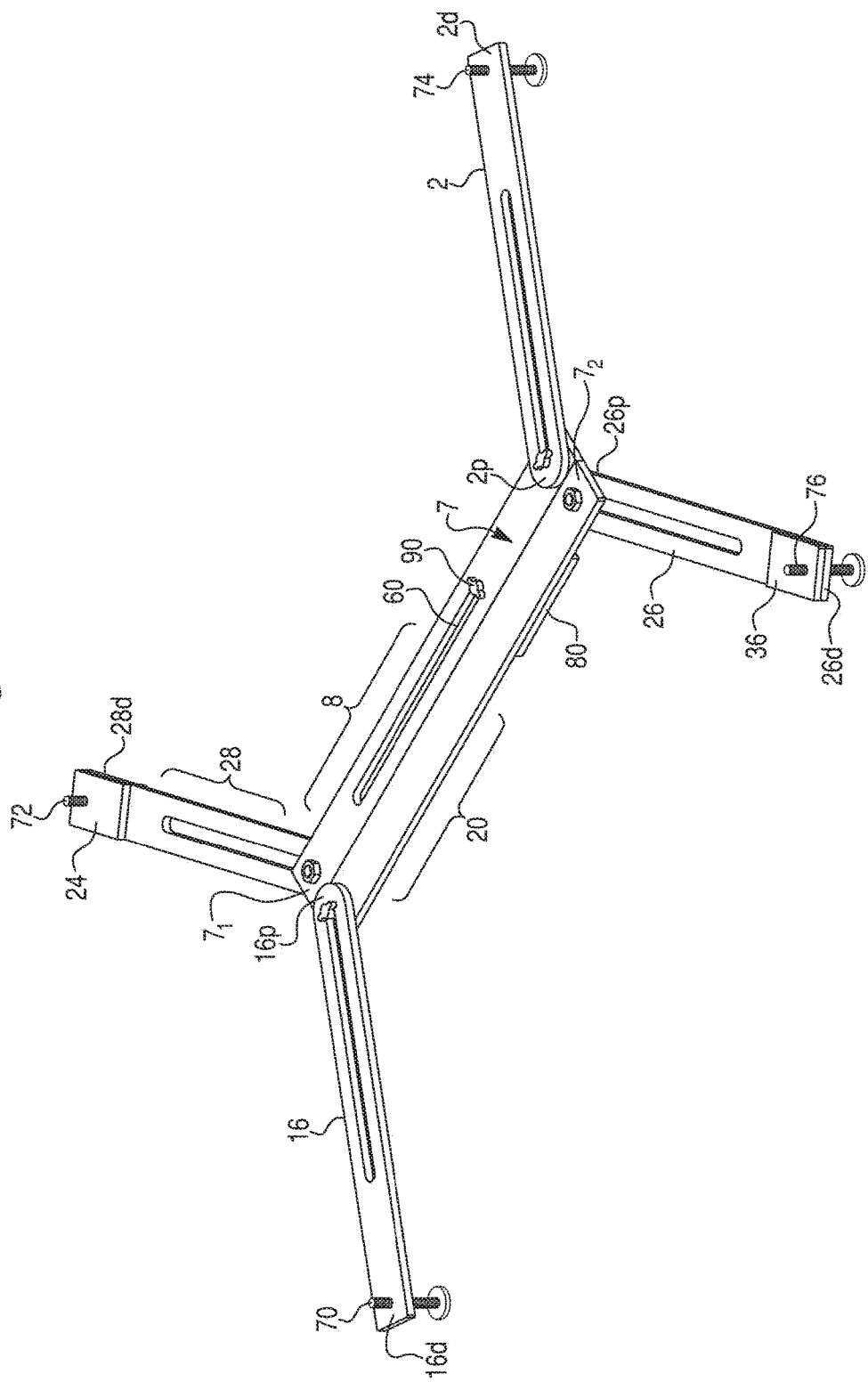

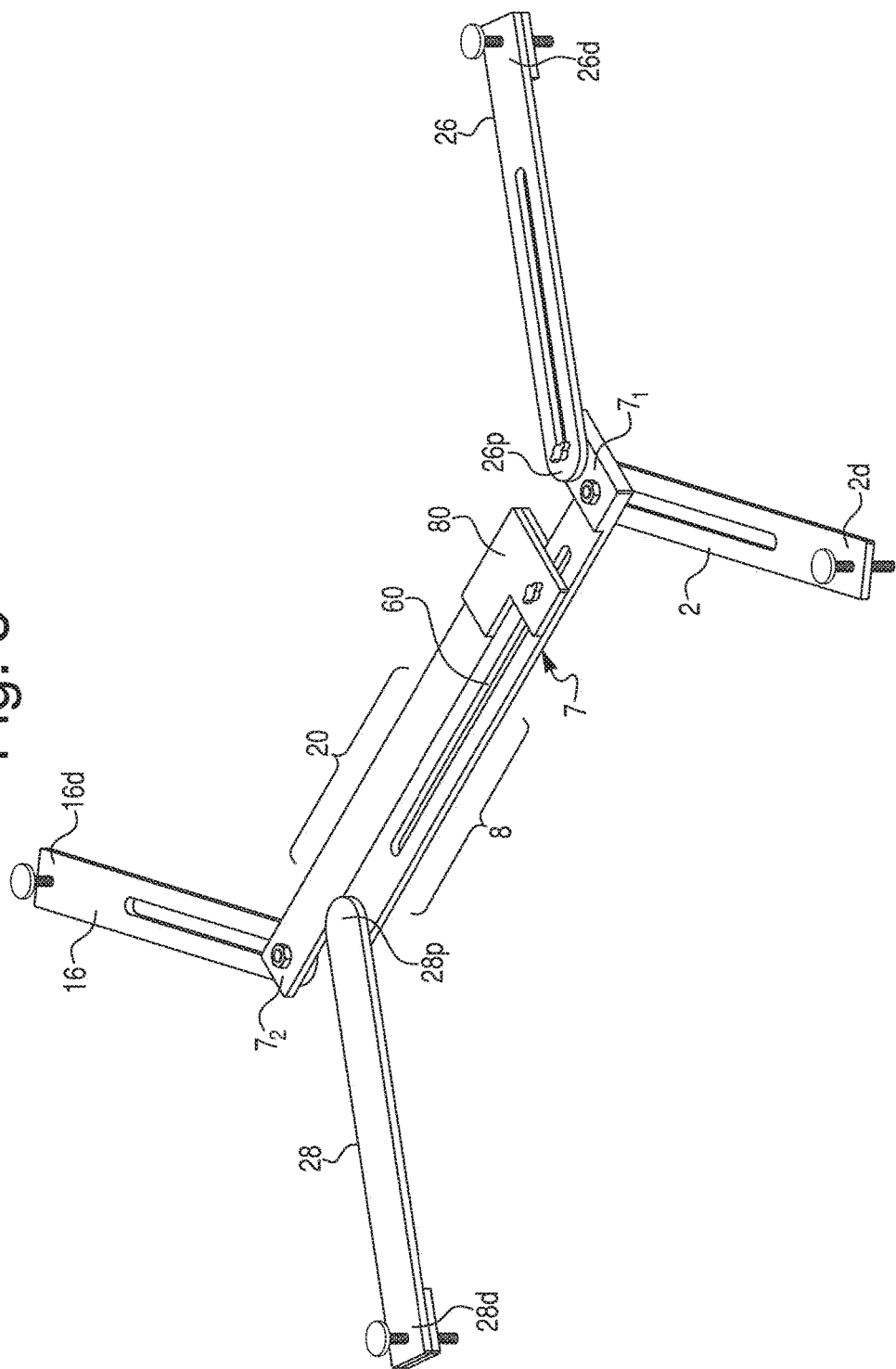

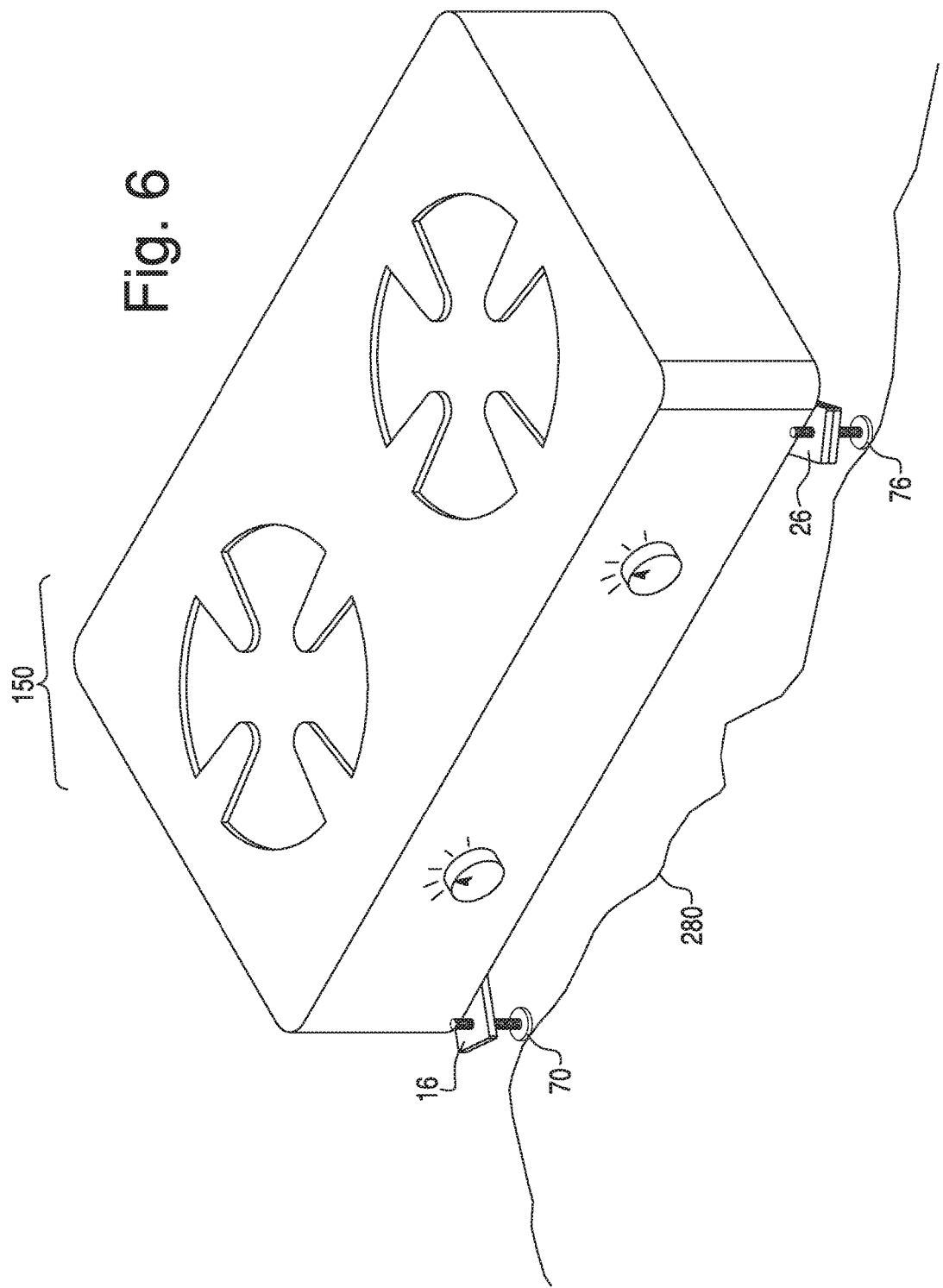

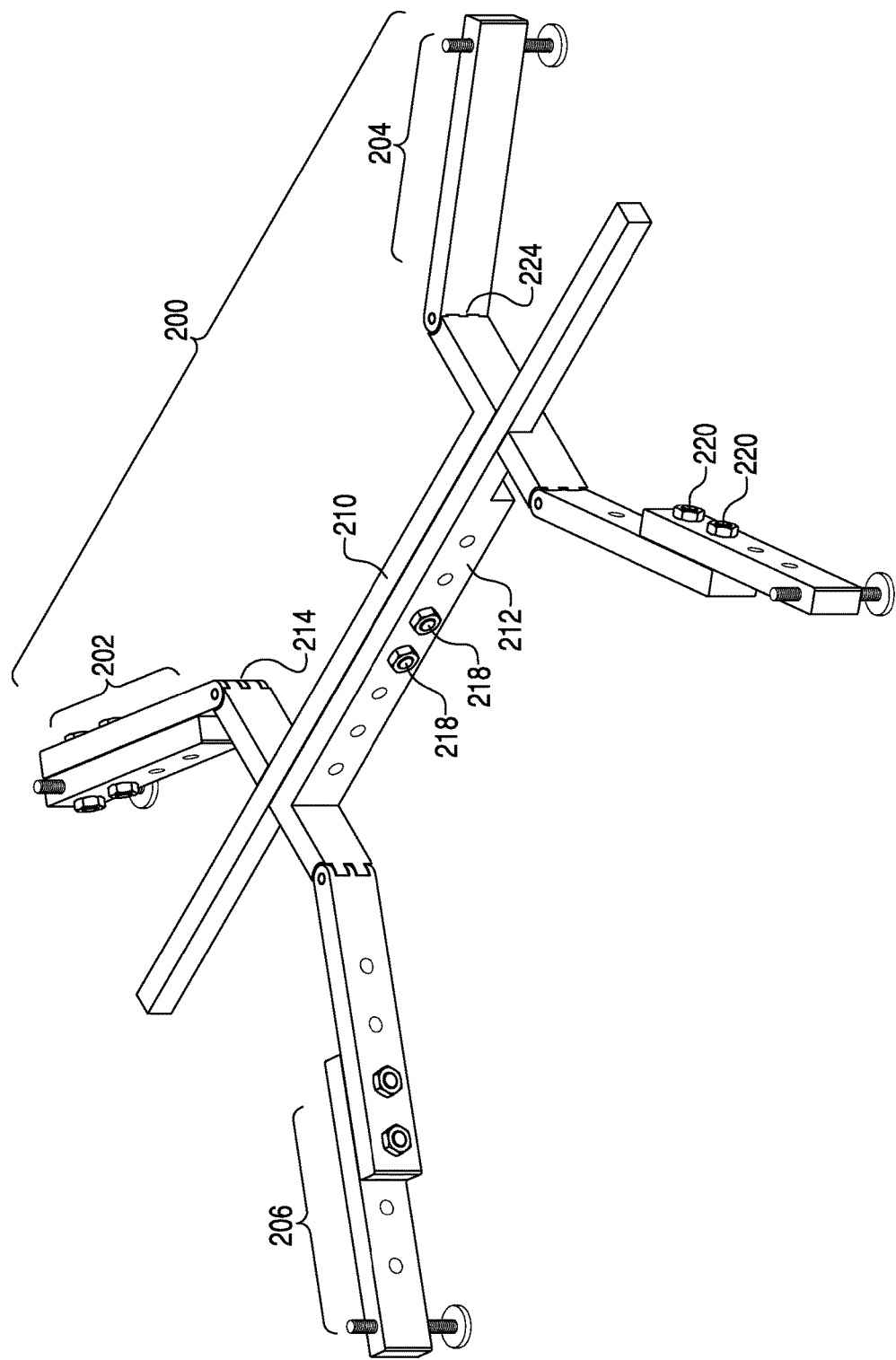

LEVELING DEVICE FOR PORTABLE STOVE

CROSS REFERENCE TO RELATED APPLICATIONS

This application claims priority to co-pending U.S. patent application Ser. No. 13/374,989, filed on Jan. 27, 2012, entitled "Leveling Device for Portable Stove". This application is incorporated by reference herein in its entirety.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of leveling devices and more specifically to a leveling device for portable stove.

Portable stoves are commonly used during camping activities. They are usually gas powered and may have one or more burners.

When setting up a camping stove on an irregular surface such as the natural ground or a sloped table top, it becomes necessary to level the cooking surface of the stove so that pots or pans placed upon the stove will sit in a level horizontal orientation. It would therefore be ideal to have a device that can help level the stove no matter what the angle of the surface under the stove, Leveling devices such as threaded metal posts have been incorporated into the underside of various home or commercial appliances so that the top of the appliance is level in the horizontal plane. However, an independent adjustable leveling device that can be adjusted to the base of most common portable stoves, and can be folded for compact storage, has not been available to date.

BRIEF SUMMARY OF THE INVENTION

The primary object of the invention is to provide a leveling device for portable stoves that allows the stove to be placed on a non level surface and be adjusted to be level for use.

Another object of the invention is to provide a leveling device for portable stoves that can adjust to easily attach to the underside of portable stoves of various sizes and models.

Another object of the invention is to provide a leveling device for portable stoves that folds compactly for shipping and storage.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a leveling device for a portable stove comprising: a first rigid elongated spine member, a second rigid elongated spine member, four rigid elongated arms, four metal threaded posts, the first elongated spine member having a centrally located elongate slot, the second elongate spine member having an integral tab portion at one end, the tab portion having an aperture that accepts a threaded screw, said threaded screw slidably fixed to said elongate slot in the first elongate spine member, the elongated arms each having a centrally located elongate slot, the elongated arms each rotatably pinned through the elongate slots of the arms to each end of the first elongate spine member and the second elongate spine member, the four metal threaded posts each screwed into mating threaded apertures at each distal end of the elongated arms, the first and second elongated spine members capable of being extended in relation to each other via the elongate slot in the first elongated spine member, and the four rigid elongated arms capable of being rotated and extended or retracted to accommodate the size of the base of any standard portable stove so that the portable stove can be placed on top of the first and second spine members and the four arms and the threaded posts can be adjusted to accommodate any irregularities in terrain that the stove would otherwise be resting upon.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a top plan view of the invention in the closed position.

FIG. 2 is a bottom plan view of the invention in the closed position.

FIG. 3 is a side view of the invention in the closed position.

FIG. 4 is a perspective view of the invention in the use position.

FIG. 5 is a perspective view of the invention with arms slightly retracted for a smaller stove.

FIG. 6 is a perspective view of the invention in use with a portable stove.

FIG. 7 is a perspective view of a first alternative embodiment of the invention.

DETAILED DESCRIPTION OF THE PREFERRED EMBODIMENTS

Figure 8:
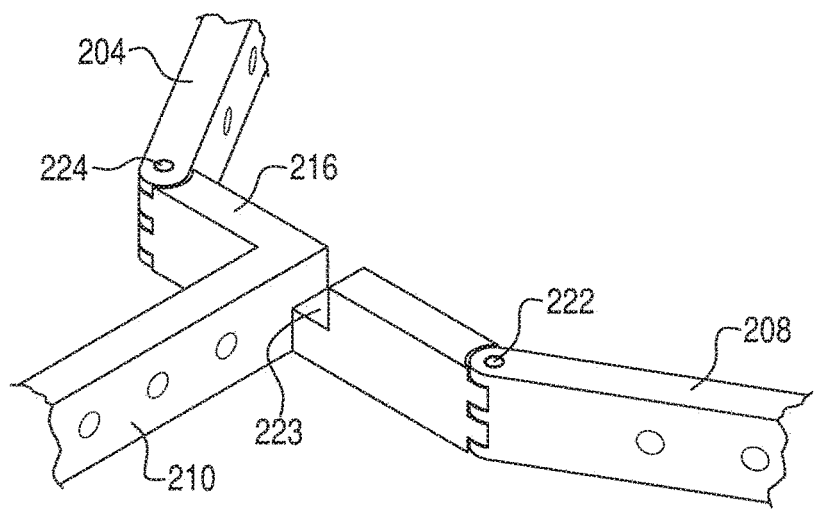
FIG. 8 is a partial perspective view of the first alternative embodiment of the invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring now to FIG. 1 a top view of the invention 1 is shown. The invention is made of a series of relatively flat, elongated, substantially straight spine members 8 and 20 that are pinned together. Arms 2 and 16 include slots 4, 14 and are pinned to the elongate spine members 20, 8 via pin members 10, 22. The pinned together elongated spine members 8, 20 define a central, substantially straight, elongated spine component 7. The pin members 10, 22 are made of threaded posts which terminate is thumb screws, such as thumb screw 6 in FIG. 1 and thumb screws 40, 46 in FIG. 2, so the user can loosen the thumb screws, rotate out the arms 2, 16 and tightened the thumb screws to lock in place in the use position as shown in FIGS. 4 and 5. Threaded apertures 18, 52 allow the user to insert a threaded post and foot 70, 74 as shown in FIG. 4. It should be noted that a first alternative embodiment can use a series of evenly spaced apertures located in each elongated spine member in place of slots. This embodiment can be seen in the first alternative embodiment shown in FIGS. 7 and 8.

FIG. 2 shows the bottom view of the invention 1 which shows arms 28, 26 which are pinned by lockable pin members or thumb screws 46 40. The arm 26 includes a hinged extension piece 24 and the arm 28 includes a hinged extension piece 36. The extension pieces 24, 36 can be folded over to create a level surface for a portable grill to sit on as shown in FIG. 4. Threaded apertures 50 align with each other when extension piece is folded over. Threaded apertures 48 align with each other when extension piece 24 is folded over. Both apertures 48, 50 allow a person to insert threaded posts and feet 72, 76.

FIG. 3 shows a side view of the invention and shows how all pieces stack on top of each other when in the closed, storage position.

FIG. 4 shows a top view of the invention in the use position. Arms 2, 26, 16, 28 are swung out from main spine elongate members 8, 20. Threaded posts 70, 72, 74, 76 are threaded into mating apertures at the end of each arm. Integral pads 24, 36 are level with the top surface of main spine members 8, 20. Slot 60 allows thumb screw 90 to be loosened or tightened to allow spine members 8, 20 to slide out from each other and be set to the desired length depending on the size of the portable grill being leveled. The portable grill 150 as shown in FIG. 6, sits on the ends of arms 16, 26, 2, 28. The threaded posts 70, 72, 74, 76 can be turned clock-wise or counter clock-wise depending on the level of a terrain 280 directly under the grill 150.

FIG. 5 shows a bottom view of the invention. In this view, the elongated spine component 7 have been extended outward and the arms 2, 26, 16, 28 swing out from the elongated spine component 7 into the use position and adjusted in length to accommodate a particular size of the portable grill. In other words, the arms 2, 26, 16, 28 are swingably (i.e., pivotally) coupled to the elongated spine component 7 so as to be angularly adjustable relative to the elongated spine component 7. Thumb screws 40, 46 are tightened at a mid point location on slot 30, 32 of the arms 26, 28. The same is true for the other three arms 16, 28, 2. The spine member 20 includes an integral tab 80. An aperture in the integral tab 80 coincides with the slot 60 to allow screw 90A to be tightened by thumb screw 90 as shown in FIG. 4. In the above described way, the invention 1 can be adjusted in size to accommodate a variety of sizes of portable grills.

Figure 15:
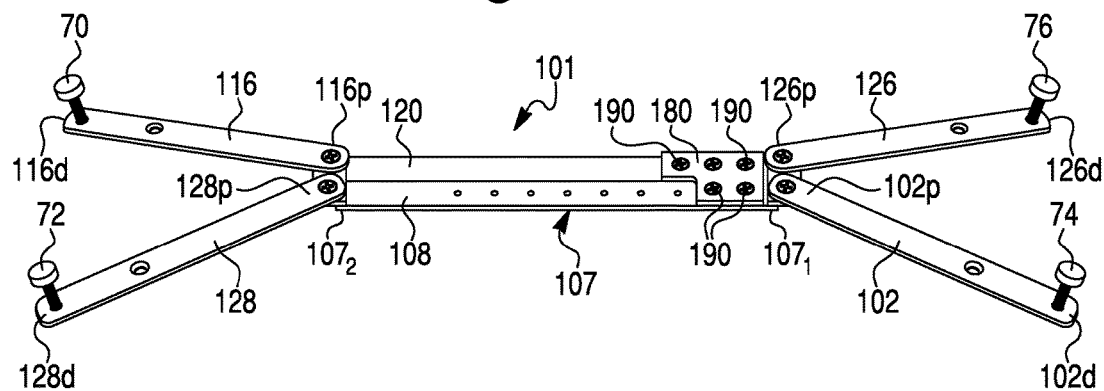
FIG. 15 is a bottom perspective view of a second alternative embodiment of the invention.
Figure 16:
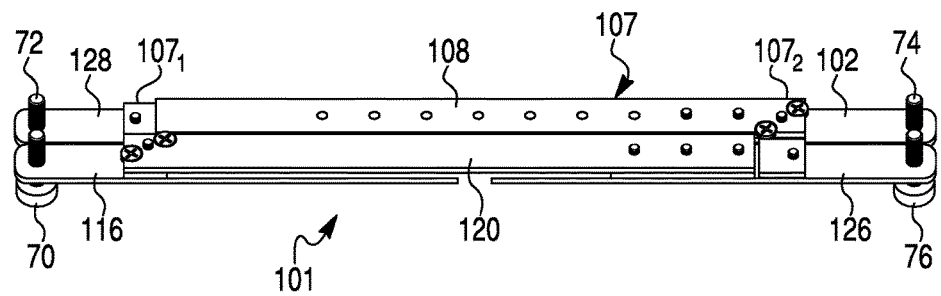
FIG. 16 is a top perspective view of the second alternative embodiment of the invention in a folded position.
Figure 17:
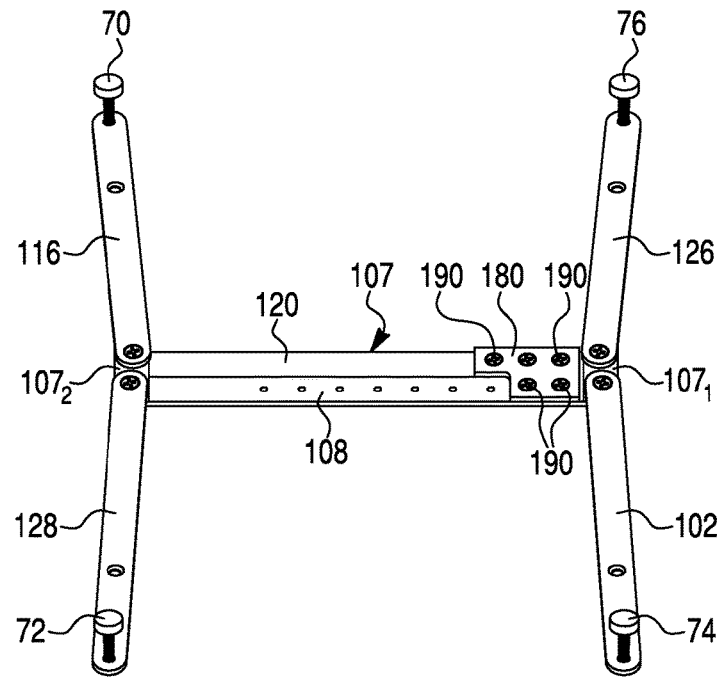
FIG. 17 is a perspective view of the second alternative embodiment of the invention.
Figure 18:
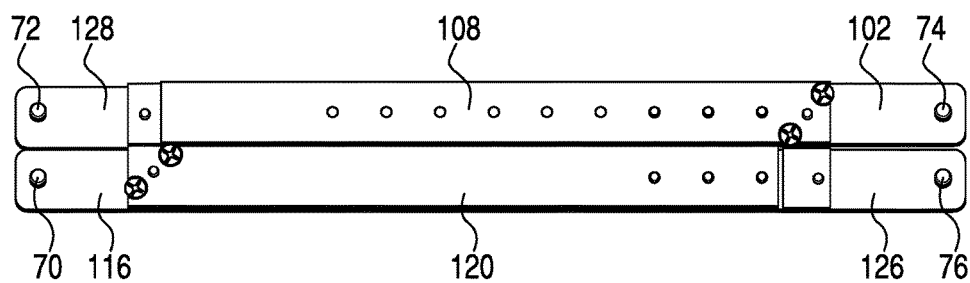
FIG. 18 is a top plan view of the second alternative embodiment of the invention in the folded position.
Figure 19:
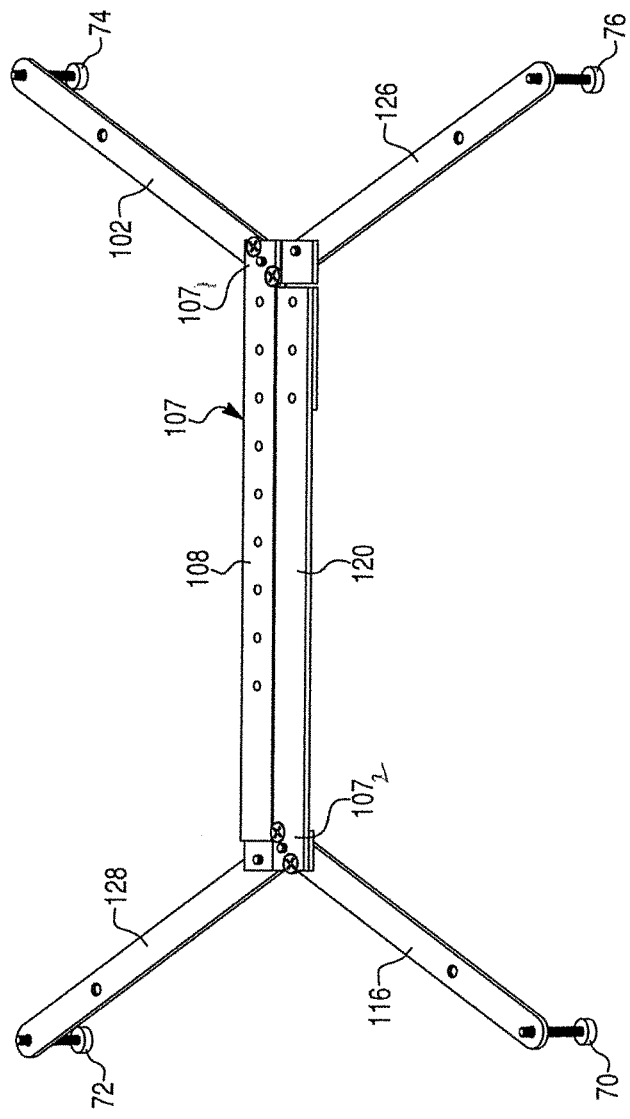
FIG. 19 is a top perspective view of the second alternative embodiment of the invention.
Figure 20:
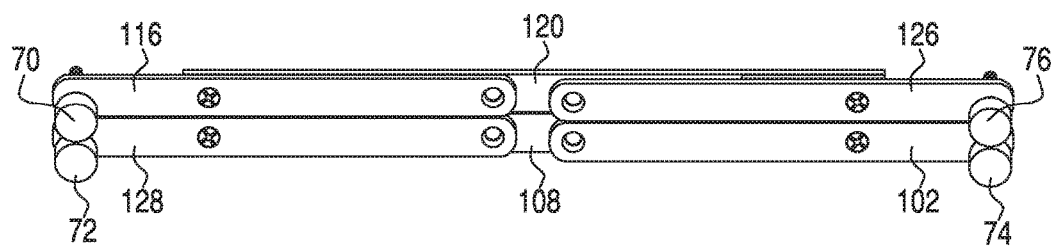
FIG. 20 is a bottom perspective view of the second alternative embodiment of the invention in the folded position.

While FIGS. 4 and 5 illustrate that the arms 2 and 16 are positioned relative to a top surface of the elongated spine component 7, and that the arms 26 and 28 are positioned relative to a bottom surface the elongated spine component 7, one of ordinary skill in the art would appreciate that the arms 2, 16, 26, 28 can be positioned in any arrangement with respect to the elongated spine component 7. For example, arms 102, 116, 126, 128 of the second alternative embodiment of the invention 101 can be positioned relative to the same surface of an elongated spine component 107 defined by elongated spine members 108 and 120, respectively, such as the top surface (not shown) or the bottom surface (as illustrated in FIGS. 15-20) of the elongated spine component 107. Also, as best shown in FIGS. 15-17 and 19, proximal ends 102p and 126p of the arms 102 and 126, respectively, are pivotally coupled to a first end 107₁ of the spine component 107, while proximal ends 116p and 128p of the arms 116 and 128, respectively, are pivotally coupled to a second end 107, (opposite to the first end 107₁) of the spine component 107. In the interest of brevity, reference characters in FIGS. 15-20 that are discussed above in connection with FIGS. 1-6 are not further elaborated upon below, except to the extent necessary or useful to explain the additional embodiments of FIGS. 15-20. The elongated spine component 107 includes an integral tab 180. Apertures in the tab 180 coincide with apertures in the elongated spine members 108 and 120 to allow screws 190 to be tightened so that the tab 180 non-moveably (when the screws are tightened) but adjustably (when the screws are removed) connects the elongated spine member 108 to the elongated spine member 120, as best shown in FIGS. 15 and 17. In the above described way, the invention 101 can be adjusted in size to accommodate a variety of sizes of portable grills. Modified components and parts, which function in the same way as in the exemplary embodiment shown in FIGS. 1-6, are indicated by the addition of a hundred digits to the reference numerals of the components or parts. Alternatively, the arms 2, 16, 26, 28 can be positioned relative to different surfaces of the elongated spine component 7. For example, the arms 2 and 26 can be positioned relative to a first surface of the elongated spine component 7, and the arms 16 and 28 can be positioned relative to a second surface of the elongated spine component 7, where the first surface could be a top surface and the second surface could be a bottom surface of the elongated spine component 7 or vice versa. In yet another exemplary embodiment, the arms 2 and 28 can be positioned relative to a first surface of the elongated spine member 8 and the arms 16 and 26 can be positioned relative to the second surface of the elongated spine 20, where the first surface could be a top surface of the elongated spine member 8 and the second surface could be a bottom surface of the elongated spine member 20 or vice versa. In addition, the arms 2, 16, 26, 28 can be coupled to the elongated spine component 7 such that the fasteners are positioned on either the top surface or bottom surface of the elongated spine component 8, 20. It is noted that while two elongated spine members 8, 20 define the elongated spine component 7 as illustrated in FIG. 4. Alternatively, a single elongated spine member can define the elongated spine component.

In an exemplary embodiment, when a fastener, such as a thumb screw, is used to couple arms 2, 16, 26, 28 to spine members 8 and 20, each thumb screw can be orientated with respect to either the top surface or the bottom surface of spine members 8 and 20 regardless of whether arms 2, 16, 26, and 28 are positioned with respect to the top surface or the bottom surface of spine members 8 and 20. For example, when arm 2 is positioned with respect to the top surface of spine 8, the thumb screw can be orientated such that the thumb screw can be loosened from the top surface of spine 8 (as illustrated in FIG. 4) or the thumb screw can be orientated such that the thumb screw can be loosened from the bottom surface of spine 8 (not illustrated).

FIG. 7 shows a first alternative embodiment of the invention 200. In this embodiment central spine members 210, 212 are pinned together by standard screws 218. The arms are also extendable and held together by screws 220 as shown in arm 208. The spine members and arms can also be fixed together by the slot and thumb screw method as shown in the preferred embodiment in FIG. 4.

FIG. 8 shows a detail partial view of one end of the first alternative embodiment 200. The elongated spine member 210 is fixed to a T member 216. A notch 223 in the T member 216 allows the elongated spine member 212 to slide through. Hinge members 222, 224 allow arms 204, 208 to swing out as needed. The arms can also be folded completely in towards the spine members 210, 212 for compact storage.

Obviously, either version of the above described portable stove leveling devices can be built into the underside of a stove by the manufacturer of the stove.

Figure 9:
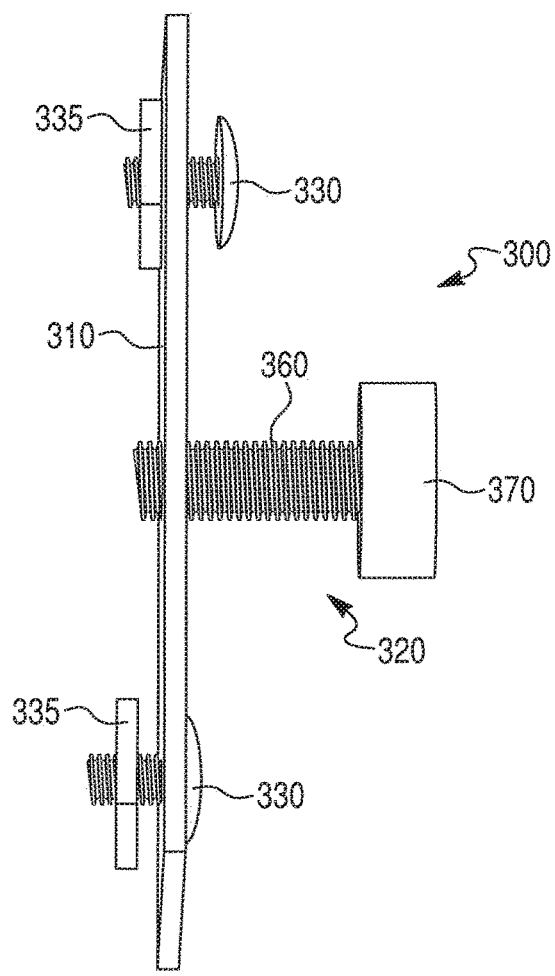
FIG. 9 is a top view of an alternative leveling device of the invention.

FIGS. 9-14 illustrate an alternative leveling device for a portable stove. As best illustrated in FIG. 9, each leveling device 300 can comprise a mounting plate 310, a leveling member 320, and fasteners 330. In an exemplary embodiment, a plurality of leveling devices 300 can be comprised in a kit. Leveling devices 300 can be positioned in any arrangement or configuration with respect to a portable stove 340. In addition, any number of leveling devices 300 can be coupled to stove 340 in order to level stove 340 with respect to the surface in which stove 340 is resting. For example, leveling device 300 can be coupled to a pan 350 of the portable stove 340 where a plurality of leveling devices 300 can be spaced apart around the pan of the portable stove. In an exemplary embodiment, leveling devices 300 can be arranged in each corner of pan 350. However, the plurality of leveling devices 300 can have any arrangement with respect to pan 350 such that leveling devices 300 can be positioned anywhere along the length and/or width of pan 350. For example, two leveling devices 300 can be positioned at the corners of the pan 350 at the front portion of stove 340 and a single leveling device 300 can be positioned between the corners of the pan 350 at the rear portion of stove 340. Alternatively, three leveling devices 300 can be equally spaced along the front portion and the rear portion of stove 340 such that one leveling device 300 can be disposed at each corner of the pan 350 of the stove 340 and one leveling device 300 can be disposed equidistant between the two leveling devices 300 disposed at the corners of the front portion and the rear portion of stove 340.

Figure 11:
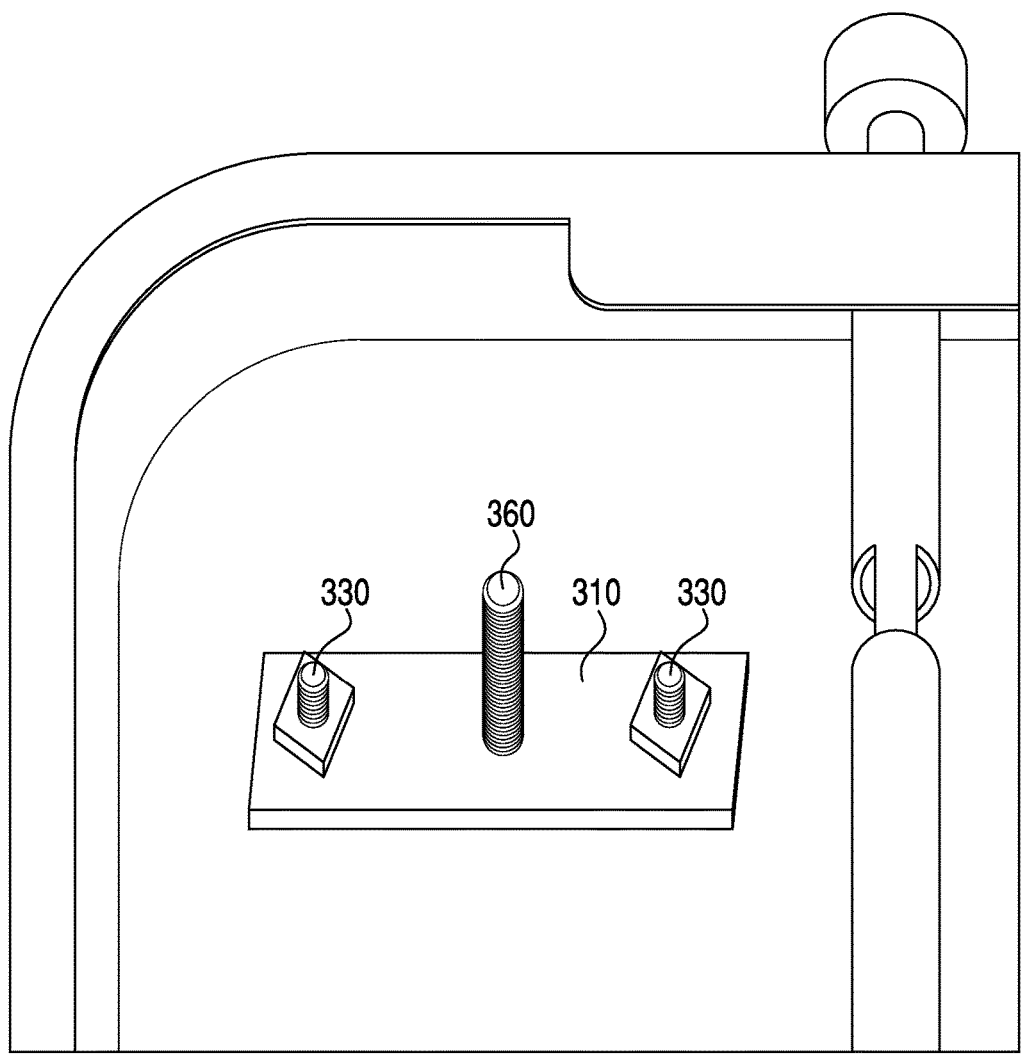
FIG. 11 is a bottom view of the alternative leveling device of the invention.
Figure 12:
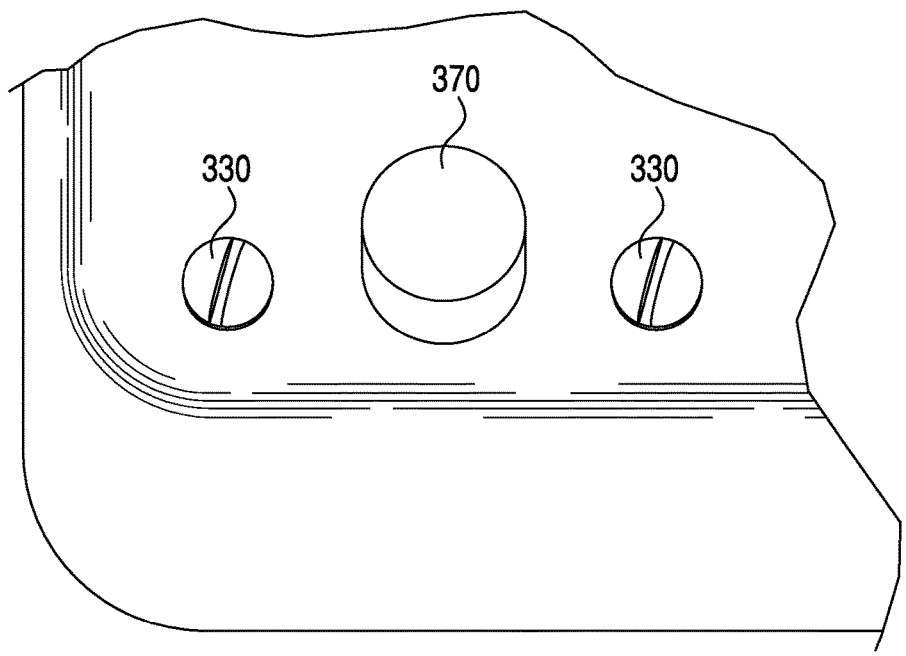
FIG. 12 is a partial perspective view of the alternative leveling device of the invention.
Figure 13:
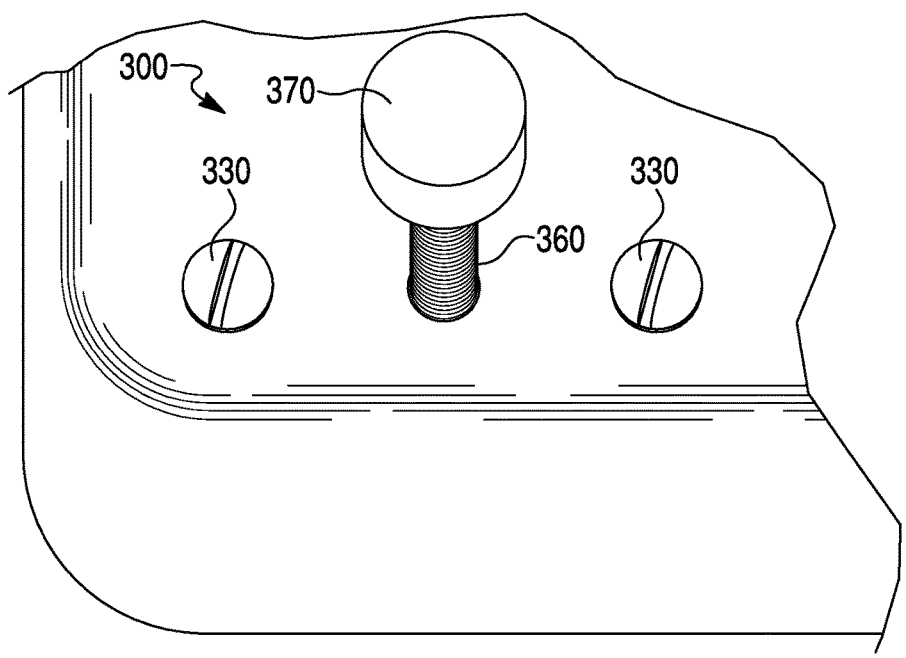
FIG. 13 is a partial perspective view of the alternative leveling device of the invention.
Figure 14:
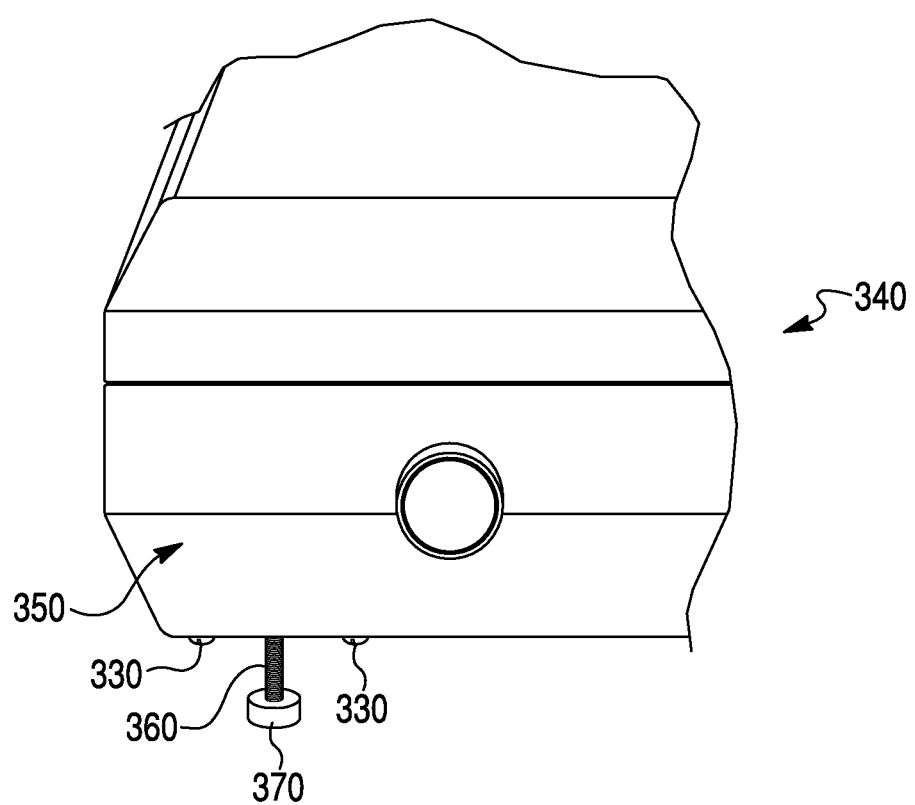
FIG. 14 is a partial perspective view of the alternative leveling device of the invention.

The mounting plate 310 can include openings to receive the leveling member 320 and fasteners 330. The mounting plate 310 can be made of any ridged material, such as metal, plastic, etc., to provide structural integrity to the leveling device when coupled to the portable stove 340. The mounting plate 310 can be mounted to the inner surface of the pan 350 of the stove 340 (as illustrated in FIG. 11 or on an outer surface of the pan 350 of the stove 340 (not shown).

Figure 10:
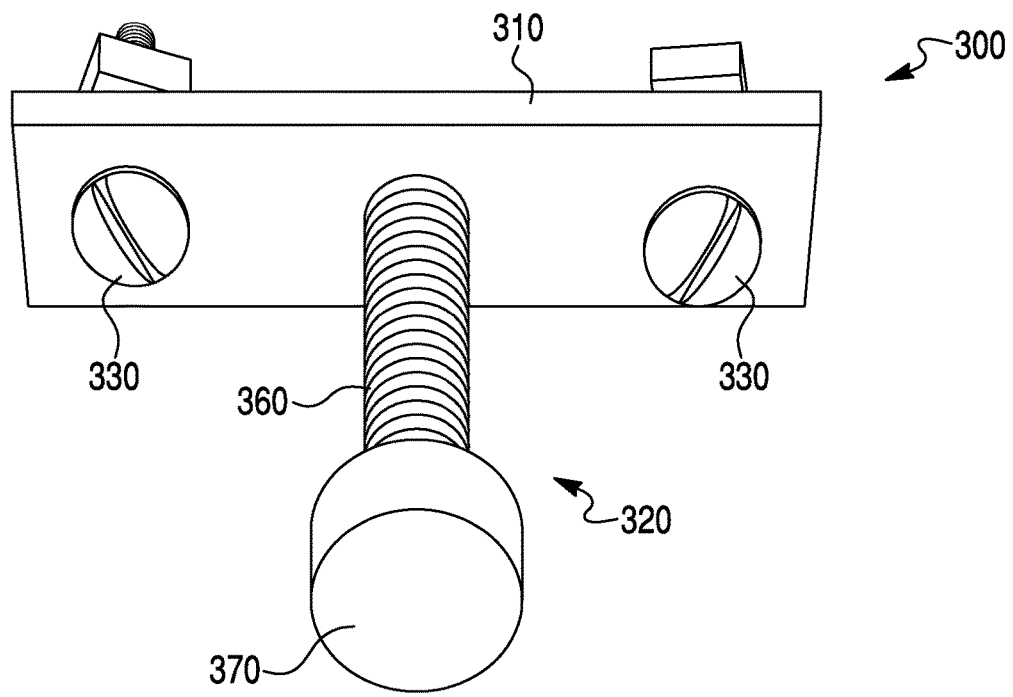
FIG. 10 is a perspective view of the alternative leveling device of the invention.

The mounting plate 310 can be coupled to the stove 340 using various fasteners 330. As best illustrated in FIGS. 9-11, fasteners 330 can be used to couple leveling device 300 to stove 340. For example, fasteners 330 can be a bolt and a nut 335 can be threaddedly engaged with bolt 330. However, any other type of fastener can be used such as screw, rivet, adhesive, etc.

Leveling member 320 can be any structure configured to be adjusted such that a change in height of the stove 340 can be produced. When a plurality of leveling members 320 are coupled to stove 340, each leveling member 320 can be independently adjusted such that the stove 340 can achieve a substantially level orientation with respect to the surface underlying the stove 340. In an exemplary embodiment, leveling member 320 can comprise a threaded post 360 and a foot 370. Threaded post 360 can be configured such that the height of foot 370 can be adjusted by rotating the leveling member 320 in the clock-wise and/or counter clock-wise direction. While a leveling member 320 having a threaded post 360 and foot 370 is illustrated in FIGS. 9-11, any type of leveling member 320 can be implemented. For example, leveling member 320 can comprise a device capable of raising and lowering foot 370 using a ratcheting technique, piston technique, etc. Foot 370 can have any size or shape capable of providing support to level the stove 340.

Each leveling device 300 can be coupled to a portable stove 340. In an exemplary embodiment, mounting plate 310 can be placed on an inner surface and/or an outer surface of a pan 350 of stove 340. One or more fastening members 330 can be engaged through an opening formed in the pan 350 in order to couple the mounting plate 310 to the inner surface and/or outer surface of pan 350. At least a portion of leveling member 320 can extend through another opening formed in pan 350, such as a portion of threaded post 360, where foot 370 extends from an outer surface of the pan 350. After all leveling devices 300 are coupled to the portable stove 340, each leveling member 320 can be individually adjusted in order to substantially level portable stove 340 with respect to the surface in which the stove 340 is resting upon. For example, leveling members 320 can be adjusted such that when the stove 340 is in use, any undesired migration of food being cooked can be substantially prevented. The height of the each leveling member 320 can be different and/or substantially the same depending on the underlying surface. The leveling device 300 can be coupled to the stove 340 at any time. For example, it could be coupled during manufacture of the stove 340 or after the stove 340 has been assembled.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:
1. A combination, comprising:
   a leveling device and a portable stove placed on top of the leveling device;
   the leveling device comprising
      a substantially straight spine component having a first end and a second end opposite to the first end;
      a plurality of arms coupled to the spine component, the plurality of arms comprising a first arm pivotally coupled to the first end of the spine component, a second arm pivotally coupled to the first end of the spine component, a third arm pivotally coupled to the second end of the spine component, and a fourth arm pivotally coupled to the second end of the spine component, each of the plurality of arms having a proximal end coupled to the spine component and a free distal end;

a plurality of leveling members, each of the plurality of leveling members coupled to the free distal end of one of the plurality of arms, each of the plurality of leveling members is independently adjustable such that the portable stove is configured to be substantially level with respect to an underlying surface, wherein the spine component comprises a substantially straight, elongated, monolithic first spine member and a substantially straight, elongated monolithic second spine member adjustably connected to the first spine member, each of the first and second spine members contains an upper surface, a lower surface, and apertures extending through the upper and lower surfaces; and a tab containing a first set of apertures on a first side of the tab and a second set of apertures on a second side of the tab, the first set of apertures matching the apertures of the first spine member and the second set of apertures matching the apertures of the second spine members, the tab connecting the first and second spine members in an adjacent parallel relationship by fastening the first set of apertures of the tab to the apertures of the first spine member and the second set of apertures of the tab to the apertures on the second spine member.

2. The combination of claim 1, wherein the first and second arms are pivotally coupled to a same surface of the spine component.

3. The combination of claim 1, wherein the third and fourth arms are pivotally coupled to a same surface of the spine component.

4. The combination of claim 1, wherein the first arm and the third arm are coupled to the first spine member of the spine component, and the second arm and the fourth arm are coupled to the second spine member of the spine component.

5. The combination of claim 1, wherein the first arm and the second arm are coupled to the first spine member of the spine component, and the third arm and the fourth arm are coupled to the second spine member of the spine component.

6. The combination of claim 1, further comprising fasteners to adjust the plurality of arms to extend from the spine component.

7. The combination of claim 1, wherein the proximal end of each of the first and second arms is pivotally coupled to the first end of the spine component.

8. The combination of claim 1, wherein the proximal end of each of the first and second arms is pivotally coupled to the first end of the spine component, and wherein the proximal end of each of the third and fourth arms is pivotally coupled to the second end of the spine component.

* * * * *